(12) United States Patent
Rosenfeld et al.

(10) Patent No.: US 11,220,587 B2
(45) Date of Patent: Jan. 11, 2022

(54) STRETCHABLE POLYMER THICK FILM CARBON BLACK COMPOSITION FOR WEARABLE HEATERS

(71) Applicant: DUPONT ELECTRONICS, INC., Wilmington, DE (US)

(72) Inventors: H David Rosenfeld, Drumore, PA (US); Ivan Chen, Taoyuan (TW); William George Kampert, Wilmington, DE (US); Ping Tzeng, Taoyuan (TW); Fred E Nagle, Landenburg, PA (US); Michael Stephen Wolfe, Wilmington, DE (US)

(73) Assignee: DUPONT ELECTRONICS, INC., Wilmingtion, DE (US)

( * ) Notice: Subject to any disclaimer, the term of this patent is extended or adjusted under 35 U.S.C. 154(b) by 52 days.

(21) Appl. No.: 16/871,789

(22) Filed: May 11, 2020

(65) Prior Publication Data
US 2020/0407531 A1 Dec. 31, 2020

Related U.S. Application Data

(60) Provisional application No. 62/846,992, filed on May 13, 2019.

(51) Int. Cl.
*C08K 3/04* (2006.01)
*H01B 1/24* (2006.01)

(52) U.S. Cl.
CPC ............... *C08K 3/04* (2013.01); *H01B 1/24* (2013.01); *C08K 2201/001* (2013.01)

(58) Field of Classification Search
CPC ..... C08K 3/04; C08K 2201/001; C08L 75/04; A41D 13/0051; C08J 2367/02; C08J 2475/04; C08J 7/0427; C08J 7/044; C09D 5/24; C09D 7/61; D06M 11/74; D06M 15/564; D06M 23/16; D06N 3/0063;
(Continued)

(56) References Cited

U.S. PATENT DOCUMENTS 5,196,145 A * 3/1993 Ishii ...................... H05B 3/146
                                                             252/511
5,250,228 A * 10/1993 Baigrie .................... C08K 3/04
                                                             219/541
(Continued)

OTHER PUBLICATIONS

Lubrizol Estane® 5712 Thermoplastic Polyurethane datasheet, Songhan Plastic Technology Co. Ltd., www.lookpolymers.com/polymer_Lubrizol-Estane-5712-Thermoplastic-Polyurethane.php (Year: 2021).*
(Continued)

*Primary Examiner* — Mark Kopec
*Assistant Examiner* — Jaison P Thomas
(74) *Attorney, Agent, or Firm* — Hong Xu

(57) ABSTRACT

A polymer thick film carbon black composition comprising 6-13 wt % conductive carbon black powder; and 87-94 wt % organic medium comprising thermoplastic polyurethane resin dissolved in an organic solvent may be used to form the resistive element of heaters in applications where significant stretching is required, particularly on substrates that can be highly elongated and, in particular, that can be used in wearable garment applications.

7 Claims, 1 Drawing Sheet

(58) Field of Classification Search
CPC ............... D06N 3/14; H05B 2203/013; H05B 2203/036; H05B 3/146; H05B 3/34; H01B 1/24
See application file for complete search history.

(56) References Cited

U.S. PATENT DOCUMENTS

| | | | |
|---|---|---|---|
| 5,344,591 A * | 9/1994 | Smuckler ............. | B60R 1/0602 219/505 |
| 10,077,372 B2 * | 9/2018 | Xiao ..................... | H05K 1/097 |
| 2010/0213189 A1 * | 8/2010 | Keite-Telgenbuescher ................ | H05B 3/845 219/548 |
| 2019/0029337 A1 * | 1/2019 | DeGanello ............... | A41B 1/08 |

OTHER PUBLICATIONS ("Raw Materials for High Performance Adhesives," Covestro, https://solutions.covestro.com/en/brands/desmocoll (Year: 2021).*

* cited by examiner

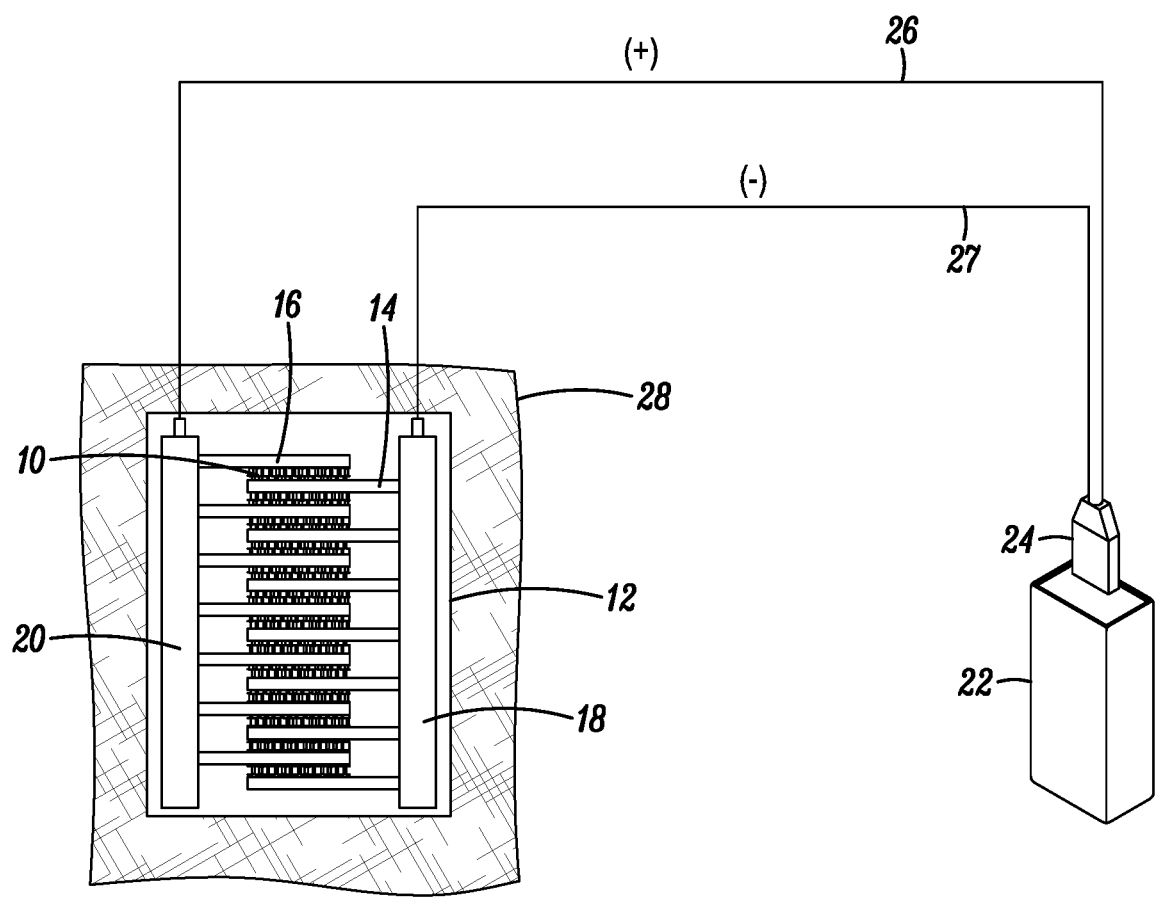

STRETCHABLE POLYMER THICK FILM CARBON BLACK COMPOSITION FOR WEARABLE HEATERS

FIELD OF THE INVENTION

This invention is directed to a polymer thick film carbon black composition. More specifically, the polymer thick film carbon black composition may be used to form heaters in applications where significant stretching is required, particularly on substrates that can be highly elongated and, in particular, can be used in wearable garments applications. Another approach utilizes printing directly onto the garment fabric, either woven or knit, to produce a stretchable heater.

BACKGROUND OF THE INVENTION

Polymer thick film (PTF) circuits have long been used as electrical elements. Although they have been used as electrical elements, the use of PTF silver or carbon conductors in highly stretchable applications such as for wearable garments has not been common. The ability to be stretched and exposed to multiple wash and dry cycles and still maintain conductivity is critical. One of the purposes of this invention is to address the above requirements and produce a stretchable PTF ink that can be used in the construction of a functional battery to be used on a substrate which may be used as a wearable garment or which can be applied to a fabric which may be used as a wearable garment.

Carbon polymer thick film (PTF) pastes can be printed to produce dried films that are considerably more resistive than those made from silver pastes. This makes them ideal candidates for resistive heating elements in printed electric resistance heaters. Silver printed circuits can provide the low resistance bus bar with little or no parasitic heating, delivering power to the active carbon elements. In many cases, some positive temperature coefficient (PTC) of resistance inherent to the carbon formulation is desirable to limit maximum operating temperature. However, in a heater attempting to extract maximum power from small power sources, a strong PTC effect can lead to problems. If designed to deliver power at operating temperatures, the cold resistance might be too low and the current demand will trigger the battery's current limiting circuitry resulting in shut down. If designed to reliably turn on when cold, the heater may not deliver enough power when warm. A low PTC carbon that is stable across the desired operating temperature range is needed.

SUMMARY OF THE INVENTION

The invention provides a polymer thick film carbon black composition comprising:
  (a) 6-13 wt % conductive carbon black powder; and
  (b) 87-94 wt % organic medium comprising 10-30 wt % thermoplastic polyurethane resin dissolved in an organic solvent, the thermoplastic polyurethane having a per cent elongation of at least 200%, wherein the weight percent of the thermoplastic polyurethane resin is based on the total weight of the organic medium and the weight percent of the conductive carbon black powder and the organic medium are based on the total weight of the composition.

The invention is further directed to using the composition to form the resistive portion of heaters for articles that require stretchable heaters, e.g., wearable garments. Therefore, the invention provides an article containing a stretchable heater formed from a polymer thick film carbon black composition comprising:
  (a) 6-13 wt % conductive carbon black powder; and
  (b) 87-94 wt % organic medium comprising 10-30 wt % thermoplastic polyurethane resin dissolved in an organic solvent, the thermoplastic polyurethane having a per cent elongation of at least 200%, wherein the weight percent of the thermoplastic polyurethane resin is based on the total weight of the organic medium and the weight percent of the conductive carbon black powder and the organic medium are based on the total weight of the composition.

In one embodiment, the article is a wearable garment.

BRIEF DESCRIPTION OF THE DRAWING

FIGURE illustrates a stretchable heater of the invention with conductors and interdigitated bus fingers on carbon black connected to a battery by wires.

DETAILED DESCRIPTION OF INVENTION

The invention relates to a polymer thick film carbon black composition for use in forming a heater and, in particular, for use in highly stretchable circuits such as those applications where a heater is formed on fabrics for clothing. This is often referred to as wearables electronics. Additionally, the composition is useful for forming heaters in applications such as heated seats. A layer of conductor is printed and dried on a substrate to produce a heater and then the entire circuit is subjected to the typical bending/creasing that a fabric would receive. Additionally, as is typical for fabrics, they must be washed and dried on a periodic basis and the conductivity and integrity of the conductor must be maintained.

Herein weight percent is written as wt %.

Organic Medium

The organic medium is comprised of a thermoplastic polyurethane resin dissolved in an organic solvent. The polyurethane resin must achieve good adhesion to an underlying substrate. The polyurethane resin must be compatible with and not adversely affect the performance of the heater after deformation and wash and dry cycles.

The thermoplastic polyurethane resin is 10-30 wt % of the total weight of the organic medium. In an embodiment, the thermoplastic polyurethane resin is a polyurethane homopolymer. In another embodiment, the polyurethane resin is a polyester-based copolymer. In one embodiment, the thermoplastic polyurethane resin is a predominantly linear hydroxyl polyurethane.

The thermoplastic polyurethane resin has a % elongation of at least 200%.

Percent elongation is defined in the usual way:

$$\text{Percent Elongation} = \frac{\text{Final Length} - \text{Initial Length}}{\text{Initial Length}} \times 100$$

The polymer resin is typically added to the organic solvent by mechanical mixing to form the medium. Solvents suitable for use in the polymer thick film composition are recognized by one of skill in the art and include acetates and terpenes such as carbitol acetate and alpha- or beta-terpineol or mixtures thereof with other solvents such as kerosene, dibutylphthalate, butyl carbitol, butyl carbitol acetate, hexylene glycol and high boiling alcohols and alcohol esters. In addition, volatile liquids for promoting rapid hardening after application on the substrate may be included. In many embodiments of the present invention, solvents such as glycol ethers, ketones, esters and other solvents of like boiling points (in the range of 180° C. to 250° C.), and mixtures thereof may be used. Various combinations of these and other solvents are formulated to obtain the viscosity and volatility requirements desired. The solvents used must solubilize the resin. Solvent may be added to the composition to adjust the viscosity and is considered part of the organic medium.

In various embodiments, the amount of organic medium is in the range of 87 to 94 wt %, based on the total weight of the composition.

Conductive Carbon Black Composition

Many carbon composite films include graphite. It is easy to get a high conductivity with modest loadings of graphite. However, contact between graphite sheets is easily disrupted by the thermal expansion of the polymer matrix and resistance increases rapidly with temperature. Therefore, highly structured carbon black (CB) powder, such as Vulcan® XC-72 and Monarch® 700 (both available from Cabot Corp, Boston, Mass.) is used in the instant composition. When suitably dispersed, carbon black can provide a conductive network that is more difficult to disrupt as the matrix expands. Too low a level of CB results in too high resistance and too high a positive temperature coefficient (PTC) of resistance. Electrical resistance generally improves as the loading of carbon black increases until the volume fraction of carbon particles is well above the percolation threshold for that particular CB. PTC also gets lower as concentration of CB is increased. Improvements become smaller as one passes through the percolation threshold. However, too high a load of CB in the dry film can lead to poor mechanical properties and crack formation during the drying process. High shear mixing can be used to provide better dispersion of the carbon to lower the percolation threshold and provide better electrical performance at lower CB loading. This results in more crack resistant and low PTC formulations. The instant conductive carbon black composition forms crack-free films with acceptably low resistivity and low PTC when processed using standard PTF blending and roll milling equipment and processes. The amount of conductive carbon black powder is in the range of 6 to 13 wt %, based on the total weight of the composition. The ratio of the weight of the polyurethane resin to the weight of the conductive carbon black powder is in the range of 1.50 to 1.75.

Some additional processing when surfactants are pre-blended with solvent and carbon black can further improve dispersion, but the surfactants are not burned out as they would be in a high temperature processed paste and raise toxicological concerns as a fugitive compound in a film that could come in contact with the skin.

Additional Powder

Various powders or additives may be added to the PTF composition to improve adhesion, modify the rheology and increase the low shear viscosity thereby improving the printability as long as they have no deleterious effect to the skin.

Application of the PTF Compositions

The PTF carbon black composition, also referred to as "paste", is deposited on a substrate which may be used in a wearable garment or which can be applied to a fabric which may be used as a wearable garment. One substrate is a thermoplastic polyurethane substrate, such as Bemis ST-604 available from Bemis Associates, Inc., Shirley, Mass. Another possible substrate is a thermoplastic polyester, such as Hytrel® available from the DuPont Co., Wilmington, Del. The substrate can also be a sheet of a composite material made up of a combination of plastic sheet with a permeable coating deposited thereupon.

The deposition of the PTF carbon black composition on the substrate is performed typically by screen printing, but other deposition techniques such as stencil printing, syringe dispensing or coating techniques can be utilized. In the case of screen-printing, the screen mesh size controls the thickness of the deposited thick film.

Generally, a thick film composition comprises a functional phase that imparts appropriate functional properties to the composition. For example, the functional phase may comprise electrically functional powders dispersed in an organic medium that acts as a carrier for the functional phase. Generally, the composition is fired to burn out both the polymer and the solvent of the organic medium and to impart the electrically functional properties. However, in the case of a polymer thick film composition, the polymer portion of the organic medium remains as an integral part of the composition after drying.

The PTF carbon black composition is processed for a time and at a temperature necessary to remove all solvent. For example, the deposited thick film is dried by exposure to heat at 130° C. for typically 10-15 min.

Heater Construction

The PTF carbon black resistive composition 10 is printed on the substrate 12 and dried as per the conditions described above. One or more layers of the PTF carbon black resistive composition 10 can be printed and dried on the substrate 12 to form the resistive element of the battery 22. Negative 14 and positive 16 bus bars and negative 18 and positive 20 conductors to the bus bars are shown in the FIGURE. Each conductor is connected to the battery 22 with a type A plug 24 by positive wire 26 and negative wire 27. Bus and conductors to the bus bars may be printed before or after the PTF carbon black resistive composition.

In one embodiment, the substrate 12 may be applied to a fabric 28 which can be used to form a wearable garment. Either side of the substrate may be applied to the fabric, i.e., the side of the substrate with the carbon black film can be adjacent to the fabric or the other side of the substrate may be adjacent to the fabric. A thermoplastic polyurethane substrate, such as DuPont™ Intexar™ TE11C or Bemis ST-604, adheres to polyester, nylon, and polyurethane or polyvinyl chloride coated fabrics.

In another embodiment, the carbon black composition may be applied directly to a stretchable permeable fabric. One such non-woven fabric is one constructed from Evolon® available from Fruedenberg Evolon, Colmar, France. Another permeable substrate that may be used for this type of application is a woven polyester coated with polyamide, e.g., Cetus® OS5000U available from Dynic Corp, Kyoto, Japan.

EXAMPLES AND COMPARATIVE EXPERIMENTS

Example 1

The PTF carbon black composition was prepared in the following manner. 69 parts by weight of an initial organic medium was used and was prepared by mixing 28.50 wt % Desmocoll® 406 polyurethane (Covestro LLC, Pittsburgh, Pa.) with 71.50 wt % Dowanol™ DPM dipropylene glycol methyl ether (Dow Co., Midland Mich.) organic solvent.

This mixture was heated at 90° C. for 1-2 hours to dissolve all the resin. 12.31 parts by weight of Vulcan® XC-72 conductive carbon black powder (Cabot Corp, Boston, Mass.) were added. Finally, 18.69 parts by weight of the Dowanol™ DPM dipropylene glycol methyl ether were added for thinning purposes to bring the composition to a desired viscosity of 70 Pas. The amount of organic medium, including the solvent added to adjust viscosity, is 87.70 wt % consisting of 68.03 wt % solvent and 19.67 wt % polyurethane resin, wherein the wt % are based on the total weight of the composition. The polyurethane resin was 22.4 wt % of the total weight of the organic medium. The ratio of the weight of the polyurethane resin to the weight of the carbon black was 1.60.

This composition was mixed for 30 minutes on a planetary mixer, and then subjected to several passes on a three roll-mill to provide good dispersion of the carbon black powder.

The composition was screen printed onto a polyester (PET) substrate and dried at 130° C. for 10 minutes in a forced oven box. There was no crack formation during the drying process. The volume percent of carbon black in the dried film was 36.6.

The resistivity of the dried film was 162 Ohms/sq. An indication of the PTC was obtained by measuring the resistance of the film at 25° C., 40° C. and 65° C. The PTC resistance factor at 40° C. (the ratio of the resistance at 40° C. to that at 25° C.) was 1.06 and the PTC resistance factor at 65° C. (the ratio of the resistance at 65° C. to that at 25° C.) was 1.18, indicating a relatively low PTC.

Example 2

The PTF carbon black composition was prepared in the following manner. 84.2 parts by weight of an initial organic medium was used and was prepared by mixing 20.50 wt % Desmocoll® 530/l polyurethane (Covestro LLC, Pittsburgh, Pa.) with 79.50 diethylene glycol monoethyl acetate (Eastman Chemical Co., Kingsport, Tenn.) organic solvent. This mixture was heated at 90° C. for 1-2 hours to dissolve all the resin. 10.80 parts by weight of Vulcan® XC-72 conductive carbon black powder (Cabot Corp, Boston, Mass.) were added. Finally, 5.00 parts by weight of the diethylene glycol monoethyl acetate were added for thinning purposes to bring the composition to a desired viscosity of 70 Pas. The amount of organic medium, including the solvent added to adjust viscosity, is 89.2 wt % consisting of 71.94 wt % solvent and 17.26 wt % polyurethane resin, wherein the wt % are based on the total weight of the composition. The polyurethane resin was 19.4 wt % of the total weight of the organic medium. The ratio of the weight of the polyurethane resin to the weight of the carbon black was 1.60.

This composition was mixed for 30 minutes on a planetary mixer, and then subjected to several passes on a three roll-mill to provide good dispersion of the carbon black powder.

The composition was screen printed onto a polyester (PET) substrate and dried at 130° C. for 10 minutes in a forced oven box. There was no crack formation during the drying process. The volume percent of carbon black in the dried film was 36.6.

The resistivity of the dried film was 187 Ohms/sq. An indication of the PTC was obtained by measuring the resistance of the film at 25° C., 40° C. and 65° C. The PTC resistance factor at 40° C. (the ratio of the resistance at 40° C. to that at 25° C.) was 1.14 and the PTC resistance factor at 65° C. (the ratio of the resistance at 65° C. to that at 25° C.) was 1.28, indicating a relatively low PTC.

Example 3

The PTF carbon black composition was prepared in the following manner. 58.50 parts by weight of an initial organic medium was used and was prepared by mixing 20.50 wt % Desmocoll® 530/l polyurethane (Covestro LLC, Pittsburgh, Pa.) with 79.50 diethylene glycol monoethyl acetate (Eastman Chemical Co., Kingsport, Tenn.). This mixture was heated at 90° C. for 1-2 hours to dissolve all the resin. 7.00 parts by weight of Vulcan® XC-72 conductive carbon black powder (Cabot Corp, Boston, Mass.) were added. Finally, 34.50 parts by weight of the diethylene glycol monoethyl acetate were added for thinning purposes to bring the composition to a desired viscosity of 70 Pas. The amount of organic medium, including the solvent added to adjust viscosity, is 93.00 wt % consisting of 81.01 wt % solvent and 11.99 wt % polyurethane resin, wherein the wt % are based on the total weight of the composition. The polyurethane resin was 12.9 wt % of the total weight of the organic medium. The ratio of the weight of the polyurethane resin to the weight of the carbon black was 1.71.

This composition was mixed for 30 minutes on a planetary mixer, and then subjected to several passes on a three roll-mill to provide good dispersion of the carbon black powder.

The composition was screen printed onto a polyester (PET) substrate and dried at 130° C. for 10 minutes in a forced oven box. There was no crack formation during the drying process. The volume percent of carbon black in the dried film was 35.

The resistivity of the dried film was 179 Ohms/sq. An indication of the PTC was obtained by measuring the resistance of the film at 25° C., 40° C. and 65° C. The PTC resistance factor at 40° C. (the ratio of the resistance at 40° C. to that at 25° C.) was 1.11 and the PTC resistance factor at 65° C. (the ratio of the resistance at 65° C. to that at 25° C.) was 1.24, indicating a relatively low PTC.

Example 4

The PTF carbon black composition was prepared in the following manner. 66.07 parts by weight of an initial organic medium was used and was prepared by mixing 27.50 wt % Desmocoll® 406 polyurethane (Covestro LLC, Pittsburgh, Pa.) with 72.50 wt % Dowanol™ DPM dipropylene glycol methyl ether (Dow Co., Midland Mich.) organic solvent. This mixture was heated at 90° C. for 1-2 hours to dissolve all the resin. 12.00 parts by weight of Vulcan® XC-72 conductive carbon black powder (Cabot Corp, Boston, Mass.) were added. 0.06 parts by weight of surfactant were added. Finally, 18.17 parts by weight of the Dowanol™ DPM diethylene glycol monoethyl acetate were added for thinning purposes to bring the composition to a desired viscosity of 70 Pas. The amount of organic medium, including the solvent added to adjust viscosity, is 87.40 wt % consisting of 69.23 wt % solvent and 18.17 wt % polyurethane resin, wherein the wt % are based on the total weight of the composition. The polyurethane resin was 20.7 wt % of the total weight of the organic medium. The ratio of the weight of the polyurethane resin to the weight of the carbon black was 1.51.

This composition was mixed for 30 minutes on a planetary mixer, and then subjected to several passes on a three roll-mill to provide good dispersion of the carbon black powder.

The composition was screen printed onto a polyester (PET) substrate and dried at 130° C. for 10 minutes in a forced oven box. There was no crack formation during the drying process. The volume percent of carbon black in the dried film was 37.

The resistivity of the dried film was 122 Ohms/sq. An indication of the PTC was obtained by measuring the resistance of the film at 25° C. and 40° C. The PTC resistance factor at 40° C. (the ratio of the resistance at 40° C. to that at 25° C.) was 1.2, indicating a relatively low PTC.

Comparative Experiment A

A PTF carbon black composition was prepared in the following manner. 61.07 parts by weight of an initial organic medium was used and was prepared by mixing 27.50 wt % Desmocoll® 406 polyurethane (Covestro LLC, Pittsburgh, Pa.) with 72.50 wt % Dowanol™ DPM dipropylene glycol methyl ether (Dow Co., Midland Mich.) organic solvent. This mixture was heated at 90° C. for 1-2 hours to dissolve all the resin. 13.00 parts by weight of Vulcan® XC-72 conductive carbon black powder (Cabot Corp, Boston, Mass.) were added. 0.06 parts by weight of surfactant were added. Finally, 25.33 parts by weight of the Dowanol™ DPM diethylene glycol monoethyl acetate were added for thinning purposes to bring the composition to a desired viscosity of 70 Pas. The amount of organic medium, including the solvent added to adjust viscosity, is 86.40 wt % consisting of 69.61 wt % solvent and 16.79 wt % polyurethane resin, wherein the wt % are based on the total weight of the composition. The polyurethane resin was 19.4 wt % of the total weight of the organic medium. The ratio of the weight of the polyurethane resin to the weight of the carbon black was 1.29.

This composition was mixed for 30 minutes on a planetary mixer, and then subjected to several passes on a three roll-mill to provide good dispersion of the carbon black powder.

The composition was screen printed onto a polyester (PET) substrate and dried at 130° C. for 10 minutes in a forced oven box. Crack formation occurred during the drying process. The volume percent of carbon black in the dried film was 40.8. The higher relative amount of carbon black resulted in the cracking.

Comparative Experiment B

A PTF carbon black composition was prepared in the following manner. 69 parts by weight of an initial organic medium was used and was prepared by mixing 28.50 wt % Desmocoll® 406 polyurethane (Covestro LLC, Pittsburgh, Pa.) with 71.50 wt % Dowanol™ DPM dipropylene glycol methyl ether (Dow Co., Midland Mich.) organic solvent. This mixture was heated at 90° C. for 1-2 hours to dissolve all the resin. 4.45 parts by weight of Vulcan® XC-72 conductive carbon black powder (Cabot Corp, Boston, Mass.) and 11.1 parts by weight of graphite were added. Finally, 35.93 parts by weight of the Dowanol™ DPM dipropylene glycol methyl ether were added for thinning purposes to bring the composition to a desired viscosity of 70 Pas. The amount of organic medium, including the solvent added to adjust viscosity, is 84.45 wt % consisting of 67.77 wt % solvent and 16.68 wt % polyurethane resin, wherein the wt % are based on the total weight of the composition. The polyurethane resin was 19.7 wt % of the total weight of the organic medium. The ratio of the weight of the polyurethane resin to the total weight of the carbon black and the graphite was 1.07.

This composition was mixed for 30 minutes on a planetary mixer, and then subjected to several passes on a three roll-mill to provide good dispersion of the carbon black powder.

The composition was screen printed onto a polyester (PET) substrate and dried at 130° C. for 10 minutes in a forced oven box. There was no crack formation during the drying process. The volume percent of carbon in the dried film was 37.5.

The resistivity of the dried film was 150 Ohms/sq. An indication of the PTC was obtained by measuring the resistance of the film at 25° C., 40° C. and 65° C. The PTC resistance factor at 40° C. (the ratio of the resistance at 40° C. to that at 25° C.) was 2.2 and the PTC resistance factor at 65° C. (the ratio of the resistance at 65° C. to that at 25° C.) was 2.9, indicating a relatively high PTC due to the presence of the graphite.

What is claimed is:

1. A polymer thick film carbon black composition comprising: (a) 6-13 wt % conductive carbon black powder; and (b) 87-94 wt % organic medium comprising 10-30 wt % thermoplastic polyurethane resin dissolved in an organic solvent, the thermoplastic polyurethane having a per cent elongation at break of at least 200%, wherein the weight percent of the thermoplastic polyurethane resin is based on the total weight of the organic medium and the weight percent of the conductive carbon black powder and the organic medium are based on the total weight of the composition,
    wherein the ratio of the weight of the polyurethane resin to the weight of the conductive carbon black powder is in the range of 1.50 to 1.75.

2. The polymer thick film carbon black composition of claim 1, wherein said thermoplastic polyurethane resin is selected from the group consisting of a polyester-based polymer, a urethane homopolymer and a linear hydroxyl polyurethane.

3. The polymer thick film carbon black composition of claim 2, wherein said thermoplastic polyurethane resin is a linear hydroxyl polyurethane.

4. An article containing a stretchable heater with a resistive element formed from a polymer thick film carbon black composition comprising: (a) 6-13 wt % conductive carbon black powder; and (b) 87-94 wt % organic medium comprising 10-30 wt % thermoplastic polyurethane resin dissolved in an organic solvent, the thermoplastic polyurethane having a per cent elongation at break of at least 200%, wherein the weight percent of the thermoplastic polyurethane resin is based on the total weight of the organic medium and the weight percent of the conductive carbon black powder and the organic medium are based on the total weight of the composition;
    wherein the ratio of the weight of the polyurethane resin to the weight of the conductive carbon black powder is in the range of 1.50 to 1.75.

5. The article of claim 4, wherein said thermoplastic polyurethane resin is selected from the group consisting of a polyester-based polymer, a urethane homopolymer and a linear hydroxyl polyurethane.

6. The article of claim 5, wherein said thermoplastic polyurethane resin is a linear hydroxyl polyurethane.

7. The article as in any of claims 4, 5 and 6, wherein the article is a wearable garment.

* * * * *